US008290068B2

(12) United States Patent
Ko et al.

(10) Patent No.: US 8,290,068 B2
(45) Date of Patent: Oct. 16, 2012

(54) MAXIMUM LIKELIHOOD DETECTION APPARATUS AND METHOD IN A WIRELESS COMMUNICATION SYSTEM

(75) Inventors: Eun-Seok Ko, Suwon-si (KR); Yung-Soo Kim, Seongnam-si (KR); Myeon-Kyun Cho, Seongnam-si (KR); In-Soo Hwang, Yongin-si (KR); Tak-Ki Yu, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 951 days.

(21) Appl. No.: 12/176,734

(22) Filed: Jul. 21, 2008

(65) Prior Publication Data

US 2009/0022251 A1    Jan. 22, 2009

(30) Foreign Application Priority Data

Jul. 20, 2007   (KR) .................. 10-2007-0072782

(51) Int. Cl.
*H04K 1/10* (2006.01)
(52) U.S. Cl. ....................................... 375/260; 375/341
(58) Field of Classification Search .................. 375/260, 375/267, 299, 329, 341, 347; 455/69, 101, 455/562.1
See application file for complete search history.

(56) References Cited

U.S. PATENT DOCUMENTS

| | | | | |
|---|---|---|---|---|
| 6,298,092 | B1 * | 10/2001 | Heath et al. ................... | 375/267 |
| 7,895,503 | B2 * | 2/2011 | Walton et al. .................. | 714/774 |
| 2005/0157809 | A1 * | 7/2005 | Yuk .............................. | 375/267 |
| 2005/0170802 | A1 | 8/2005 | Oh et al. | |
| 2005/0220200 | A1 * | 10/2005 | Giannakis et al. ............ | 375/260 |
| 2005/0276362 | A1 | 12/2005 | Yu et al. | |
| 2007/0077969 | A1 * | 4/2007 | Lauer et al. ................. | 455/562.1 |
| 2008/0126908 | A1 * | 5/2008 | Lin .............................. | 714/758 |

FOREIGN PATENT DOCUMENTS

| KR | 1020050078499 | 8/2005 |
|---|---|---|
| KR | 1020060061508 | 6/2006 |
| KR | 1020070046331 | 5/2007 |

* cited by examiner

*Primary Examiner* — Leon-Viet Nguyen
(74) *Attorney, Agent, or Firm* — The Farrell Law Firm, P.C.

(57) ABSTRACT

A Maximum Likelihood (ML) detection apparatus and method in a wireless communication system are provided, in which a Euclidean distance are calculated using at least one of channel matrix information, noise power information and modulation order information of each stream, Pairwise Error Rate (PER) are calculated using the Euclidean distance, an error probability of the each stream is calculated using the PER, the error probability of the each stream is ordered and sorted, and ML detection is performed using a result of the ordering and sorting.

20 Claims, 5 Drawing Sheets

MAXIMUM LIKELIHOOD DETECTION APPARATUS AND METHOD IN A WIRELESS COMMUNICATION SYSTEM

PRIORITY

This application claims priority under 35 U.S.C. §119(a) to a Korean Patent Application filed in the Korean Intellectual Property Office on Jul. 20, 2007 and assigned Serial No. 2007-72782, the contents of which are incorporated herein by reference.

BACKGROUND OF THE INVENTION

1. Field of the Invention

The present invention relates to a low-complexity Maximum Likelihood (ML) detection apparatus and method in a wireless communication system.

2. Description of the Related Art

Many studies have recently been conducted on techniques for reducing complexity, a problem encountered with an ML receiver, while satisfying the performance requirement of the ML receiver. In this context, ML receivers with far less complexity, viable for a real system, have been proposed, such as QR-decomposition Modified Maximum Likelihood Detector (QRM-MLD), Recursive Modified Maximum Likelihood (RMML), Sorted Modified Maximum Likelihood (SMML), and Minimum Mean Square Error Ordered Successive Interference Cancellation (MMSE-OSIC) with Candidates (MOC).

Despite significant progress that has been achieved in reducing the complexity of ML receivers, the complexity reduction for low-complexity ML receivers is based on the premise that all streams are modulated by the same scheme.

Conventionally, most low-complexity ML receivers use ordering/sorting, or perform ordering/sorting using the norms of the column vectors of a channel matrix since the norm of each column vector is proportional to Signal-to-Noise Ratio (SNR), which can be ordered according to norms. Hence, if the same modulation scheme applies to all streams, a higher column vector norm increases the SNR, thereby decreasing error probability.

However, if a different modulation scheme is used for each stream, a high error probability may result depending on the used modulation scheme even though the SNR is high. In this case, column vector norm-based ordering/sorting alone makes it impossible to order/sort error probabilities. As a consequence, the error probability performance of a conventional low-complexity ML receiver can be degraded.

SUMMARY OF THE INVENTION

An aspect of the present invention is to address at least the foregoing problems and/or disadvantages and to provide at least the advantages described below. Accordingly, an aspect of the present invention is to provide an ML detection apparatus and method in a low-complexity ML receiver when different modulations are used for different streams in a wireless communication system with multiple transmit/receive antennas.

In accordance with the present invention, there is provided an ML detection method in a wireless communication system, in which a Euclidean distance is calculated using at least one of channel matrix information, noise power information and modulation order information of the each stream, Pairwise Error Rate (PER) is calculated using the Euclidean distance, an error probability of the each stream is calculated using the PER, the error probability of the each stream is ordered and sorted, and ML detection is performed using a result of the ordering and sorting.

In accordance with the present invention, there is provided an ML detection method in a wireless communication system, in which an SNR of each stream is calculated using at least one of channel matrix information, noise power information and modulation order information of the each stream, an error probability of the each stream is calculated using the SNR, the error probability of the each stream is ordered and sorted and ML detection is performed using a result of the ordering and sorting.

In accordance with the present invention, there is provided an ML detection apparatus in a wireless communication system, in which a Euclidean distance calculator calculate Euclidean distance using at least one of channel matrix information, noise power information and modulation order information of the each stream, a PER calculator calculates PER using the Euclidean distance, a stream error probability calculator calculates an error probability of the each stream using the PER and an order and sorter orders and sorts the error probability of the each stream.

In accordance with the present invention, there is provided an ML detection apparatus in a wireless communication system, in which an SNR calculator calculates a SNR of each stream using at least one of channel matrix information, noise power information and modulation order information of each stream, a stream error probability calculator calculates an error probability of the each stream using the SNR and an order and sorter orders and sorts the error probability of the each stream.

BRIEF DESCRIPTION OF THE DRAWINGS

The above and other objects, features and advantages of preferred embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Preferred embodiments of the present invention provide an ML detection apparatus and method for reducing complexity in a wireless communication system.

To this end, the present invention uses error probabilities computed on a stream basis in a low-complexity ML receiver, thereby maximizing the performance of the low-complexity ML receiver.

Figure 1:
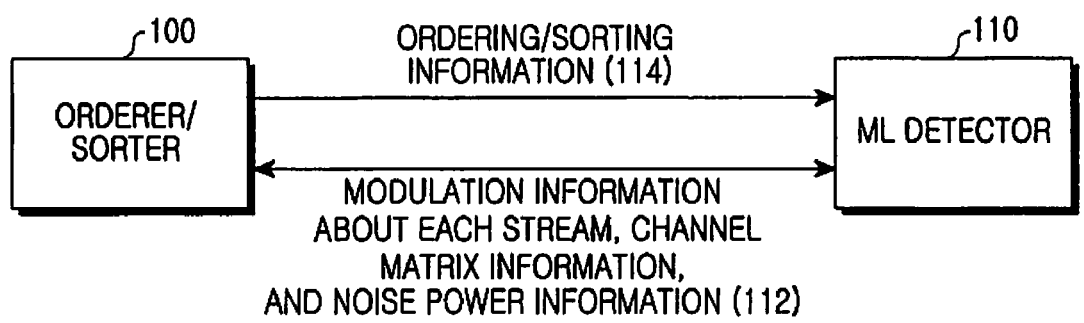
FIG. 1 illustrates a low-complexity ML receiver that considers a different modulation scheme for each stream according to the present invention.

FIG. 1 illustrates a low-complexity ML receiver that considers a different modulation scheme for each stream according to the present invention.

Referring to FIG. 1, the low-complexity ML receiver includes an orderer/sorter 100 and an ML detector 110. The orderer/sorter 100 orders/sorts the error probabilities of individual streams using information 112 about modulation order information of each stream, a channel matrix and noise power, shared with the ML detector 110.

The ML detector 110 executes a low-complexity ML detection algorithm based on ordering/sorting information 114 received from the orderer/sorter 100. The ordering/sorting information 114 is set according to the error probability of each stream. Ordering/sorting can be repeated when requested by the low-complexity ML detection algorithm of the ML detector 110.

Figure 2:
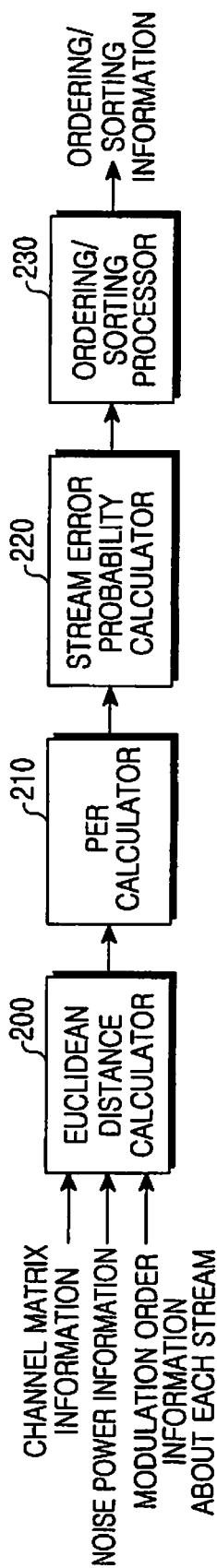
FIG. 2 illustrates an orderer/sorter for calculating an error probability on a stream-by-stream basis according to a first embodiment of the present invention.

FIG. 2 illustrates an orderer/sorter for calculating error probabilities on a stream basis according to a first embodiment of the present invention.

Referring to FIG. 2, the orderer/sorter includes a Euclidean distance calculator 200, a Pairwise Error Rate (PER) calculator 210, a stream error probability calculator 220 and an ordering/sorting processor 230.

The Euclidean distance calculator 200 calculates a Euclidean distance by using Equation (3), shown below, and provides them to the PER calculator 210. The PER calculator 210 calculates PER by Equation (4), shown below, and the stream error probability calculator 220 calculates the error probability of each stream using the PER. The ordering/sorting processor 230 orders/sorts the error probability of each stream.

In operation, the Euclidean distance calculator 200 calculates a Euclidean distance of each stream according to a constellation combination using channel matrix information, noise power information and modulation order information about each stream and provides the Euclidean distance to the PER calculator 210. The Euclidean distance can be calculated by Equations (1), (2) and (3), shown below. Herein, a Multiple Input Multiple Output (MIMO) system is taken as an example, in which $N_T$ transmit antennas and $N_R$ receive antennas are used, $N_T$ streams are transmitted, and $N_T \leq N_R$. It is assumed that each stream is transmitted by a different modulation scheme. While the present invention is described in the context of the MIMO system, it is to be clearly understood that the present invention is applicable to any wireless communication system. As shown in the following Equations (1), (2) and (3), $$r = Hs + n \quad (1)$$

$$\hat{s} = \min_{\hat{s} \in S_{\mu i}} \|r - H\hat{s}\|^2 \quad (2)$$

$$d_{ij}^2(H) = \|H(\hat{s}_i - \hat{s}_j)\|_F^2 \quad (3)$$

In Equation (1), n denotes an $N_R \times 1$ Gaussian noise vector, including a zero mean and a co-variance matrix $\sigma_n^2 I_{N_R}$. H denotes an $N_R \times N_T$ channel matrix and s denotes a symbol vector.

Equation (2) describes transmitted symbols. $\|\bullet\|^2$ denotes a vector norm and $S_{set}$ denotes a set of all possible transmission symbol vectors that can be generated according to the modulation scheme of each stream. For instance, let the modulation order of an $m^{th}$ element in the symbol vector s be denoted by $M_{TX}(m)$. Given $N_T = 2$, $M_{TX}(1)$=Binary Phase Shift Keying (BPSK), and $M_{TX}(2)$=Quadrature Phase Shift Keying (QPSK), then $$S_{set} = \begin{Bmatrix} [1(1+j)/\sqrt{2}]^T, [1(1-j)/\sqrt{2}]^T, [1(-1+j)/\sqrt{2}]^T, \\ [1(-1-j)/\sqrt{2}]^T, [-1(1+j)/\sqrt{2}]^T, [-1(1-j)/\sqrt{2}]^T, \\ [-1(-1+j)/\sqrt{2}]^T, [-1(-1-j)/\sqrt{2}]^T \end{Bmatrix}$$

where $\hat{s}$ is an element of $S_{set}$ and is selected as final transmitted symbols by Equation (2). $M_{TX}(m)$ denotes a different modulation scheme for each stream.

Equation (3) computes a Euclidean distance using Equations (1) and (2). $d_{ij}^2(H)$ is a Euclidean distance and $\hat{s}_i$ and $\hat{s}_j$ are transmitted symbols. $\|\bullet\|_F^2$ is a Frobenius vector norm.

The PER calculator 210 calculates PER based on the received the Euclidean distance, as shown in Equation (4), by $$P(\hat{s}_i \to \hat{s}_j \mid H) = Q\left(\sqrt{\frac{E_s}{2\sigma_n^2} d_{ij}^2(H)}\right) \quad (4)$$

where $E_s$ denotes a total transmit power, $\sigma_n^2$ denotes a noise power, and Q(x) is a Gaussian error function expressed, as shown in Equation (5), as $$Q(x) = \int_x^\infty \frac{1}{\sqrt{2\pi}} \exp\left(-\frac{y^2}{2}\right) dy \quad (5)$$

As noted from Equation (4), the PER equation denotes the probability of detecting an incorrect $\hat{s}_j$ for a transmitted $\hat{s}_i$. Thus, the PER equation is used to determine whether a transmission symbol of a vector, not a stream, has errors.

Accordingly, to generate error probability information about each stream, the PER computed by Equation (4) should be converted to the error probability of each stream.

Figure 3:
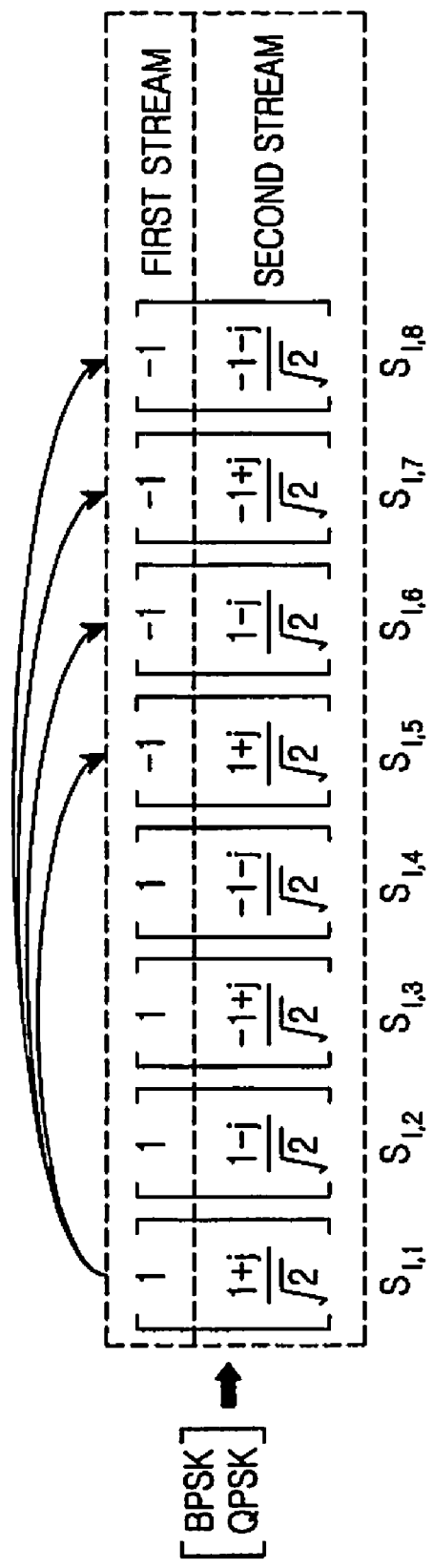
FIG. 3 illustrates a preferred relation between pairwise errors and errors of an individual stream according to the present invention.

FIG. 3 illustrates a preferred relation between pairwise errors between $\hat{s}_i$ and $\hat{s}_j$, and error of each stream, according to the present invention.

Referring to FIG. 3, for a first stream, fifth to eighth cases have symbol errors. That is, four symbol errors are generated among seven pairwise errors. Hence, with respect to the first stream, symbol error-free streams such as second, third and fourth cases can exist even though they have pairwise errors.

Therefore, the stream error probability calculator 220 calculates the error probability of each stream using PER computed for the stream by Equation (6), as follows, and provides the error probability to the ordering/sorting processor 230.

$$P_s(m|H) \leq \sum_i P(\hat{s}_i) \sum_{i \neq j} \kappa_m(\hat{s}_i, \hat{s}_j) P(\hat{s}_i \to \hat{s}_j | H) + f_m(e) \quad (6)$$

where $P_s(m|H)$ denotes the error probability of an $m^{th}$ stream for a given instantaneous channel matrix H, $P(\hat{s}_i)$ denotes the probability of $\hat{s}_i$ being transmitted, and $\kappa_m(\hat{s}_i, \hat{s}_j)$ denotes a parameter indicating whether a symbol of the $m^{th}$ stream in $\hat{s}_i$ is different to a symbol of the $m^{th}$ stream in $\hat{s}_j$, $P(\hat{s}_i \to \hat{s}_j|H)$ denotes a probability of detecting an incorrect $\hat{s}_j$ for a transmitted symbol $\hat{s}_i$, for the given instantaneous channel matrix H. In general, a receiver estimates channels and thus H may involve a variety of error performances such as channel estimation errors. Thus, $f_m(e)$ is a function for correcting errors that occur in the $m^{th}$ stream.

In FIG. 3, for example, the error probability of each stream is computed by Equations (7) and (8), as shown below. Assuming that $f_m(e)=0$ for every m and the probability of $\hat{s}_i$ being transmitted is equal, $P(\hat{s}_j)=\frac{1}{8}$. Regarding $\kappa_m(\hat{s}_i, \hat{s}_j)$, $K_1(\hat{s}_1, \hat{s}_2)=0$, $K_1(\hat{s}_1, \hat{s}_3)=0$, $K_1(\hat{s}_1, \hat{s}_4)=0$, ..., $K_2(\hat{s}_1, \hat{s}_2)=1$, $K_2(\hat{s}_1, \hat{s}_3)=1$, $K_2(\hat{s}_1, \hat{s}_4)=1$, ..., $K_2(\hat{s}_8, \hat{s}_7)=1$. By substituting these values into Equation (6), $$P_s(1|H) \leq \frac{1}{8} \sum_i \sum_{i \neq j} K_m(\hat{s}_i, \hat{s}_j) P(\hat{s}_i \to \hat{s}_j | H) = \quad (7)$$

$$\frac{1}{4}(P(\hat{s}_1 \to \hat{s}_5 | H) + P(\hat{s}_1 \to \hat{s}_6 | H) + P(\hat{s}_1 \to \hat{s}_7 | H) + P(\hat{s}_1 \to \hat{s}_8 | H) +$$
$$P(\hat{s}_2 \to \hat{s}_5 | H) + P(\hat{s}_2 \to \hat{s}_6 | H) + P(\hat{s}_2 \to \hat{s}_7 | H) +$$
$$P(\hat{s}_2 \to \hat{s}_8 | H) + P(\hat{s}_3 \to \hat{s}_5 | H) + P(\hat{s}_3 \to \hat{s}_6 | H) +$$
$$P(\hat{s}_3 \to \hat{s}_7 | H) + P(\hat{s}_3 \to \hat{s}_8 | H) + P(\hat{s}_4 \to \hat{s}_5 | H) +$$
$$P(\hat{s}_4 \to \hat{s}_6 | H) + P(\hat{s}_4 \to \hat{s}_7 | H) + P(\hat{s}_4 \to \hat{s}_8 | H)$$

$$P_s(2|H) \leq \quad (8)$$

$$\frac{1}{4}(P(\hat{s}_1 \to \hat{s}_2 | H) + P(\hat{s}_1 \to \hat{s}_3 | H) + P(\hat{s}_1 \to \hat{s}_4 | H) + P(\hat{s}_1 \to \hat{s}_6 | H) +$$
$$P(\hat{s}_1 \to \hat{s}_7 | H) + P(\hat{s}_1 \to \hat{s}_8 | H) +$$
$$P(\hat{s}_2 \to \hat{s}_3 | H) + P(\hat{s}_2 \to \hat{s}_4 | H) + P(\hat{s}_2 \to \hat{s}_5 | H) +$$
$$P(\hat{s}_2 \to \hat{s}_7 | H) + P(\hat{s}_2 \to \hat{s}_8 | H) + P(\hat{s}_3 \to \hat{s}_4 | H) +$$
$$P(\hat{s}_3 \to \hat{s}_5 | H) + P(\hat{s}_3 \to \hat{s}_6 | H) + P(\hat{s}_3 \to \hat{s}_8 | H) +$$
$$P(\hat{s}_4 \to \hat{s}_5 | H) + P(\hat{s}_4 \to \hat{s}_6 | H) + P(\hat{s}_4 \to \hat{s}_7 | H) +$$
$$P(\hat{s}_5 \to \hat{s}_6 | H) + P(\hat{s}_5 \to \hat{s}_7 | H) + P(\hat{s}_5 \to \hat{s}_8 | H) +$$
$$P(\hat{s}_6 \to \hat{s}_7 | H) + P(\hat{s}_6 \to \hat{s}_8 | H) + P(\hat{s}_7 \to \hat{s}_8 | H)$$

As described above, the use of a different modulation scheme for each stream affects a Euclidean distance $d_{ij}^2(H)$ and thus the error probability of each stream can be calculated according to the modulation scheme.

The ordering/sorting processor 230 orders/sorts the error probability of each stream in an ascending or descending order and provides the resulting ordering/sorting information to the low-complexity ML detector.

As illustrated in FIG. 2, the orderer/sorter can compute the error probability of each stream for the low-complexity ML receiver, but requires a considerably high computational complexity. Therefore, error probabilities need to be calculated simply, taking into account the modulation scheme of each stream, for ordering/sorting.

Figure 4:
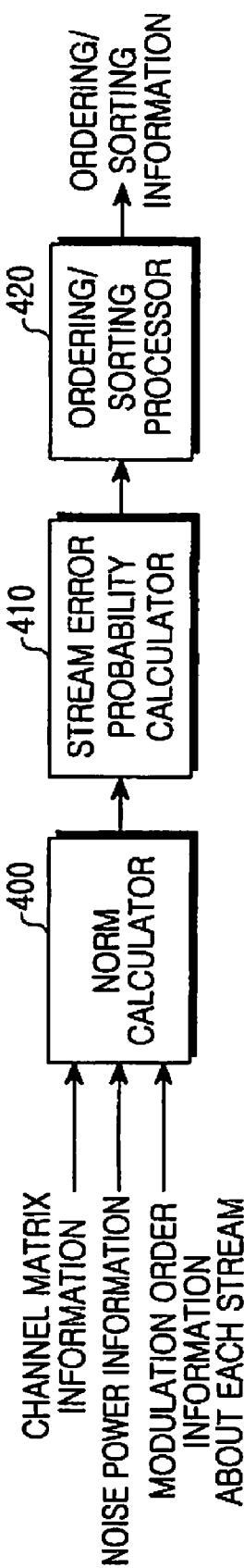
FIG. 4 illustrates an orderer/sorter for calculating an error probability on a stream-by-stream basis according to a second embodiment of the present invention.

FIG. 4 illustrates an orderer/sorter for calculating the error probability of each stream according to a second embodiment of the present invention.

Referring to FIG. 4, the orderer/sorter includes a norm calculator 400, a stream error probability calculator 410 and an ordering/sorting processor 420.

The norm calculator 400 calculates the norms of column vectors of a channel matrix using channel matrix information, noise power information and modulation order information for each stream and provides the norms to the stream error probability calculator 410.

The norms of the column vectors are proportional to the SNR of each stream. Using this information, the stream error probability calculator 410 calculates an SNR using a norm by Equation (9), as shown below, and calculates an error probability corresponding to each modulation by Equations (10), (11) and (12), as shown below. In Equation (9), $$SNR_m = \frac{\|h_m\|^2}{N_T} \cdot \frac{E_s}{\sigma_n^2}. \quad (9)$$

where $SNR_m$ denotes the SNR of an $m^{th}$ stream, $N_T$ denotes the number of transmit antennas and $h_m$ denotes an $m^{th}$ column of a channel matrix H. In addition to $\|\cdot\|^2$ denotes a vector norm, $E_s$ denotes a total transmit power and $\sigma_n^2$ denotes noise power.

For Binary Phase Shift Keying (BPSK), the error probability is computed as shown in Equation (10) by $$f_{M_{TX}(m)=BPSK}(SNR_m) = Q(\sqrt{2 \cdot SNR_m}) \quad (10)$$

where $Q(\bullet)$ is a Gaussian error function.

For MPSK (M is a modulation order), the error probability is computed as shown in Equation (11) by $$f_{M_{TX}(m)=MPSK}(SNR_m) \approx 2Q\left(\sqrt{2 \cdot SNR_m} \sin\left(\frac{\pi}{M}\right)\right) \quad (11)$$

where $Q(\bullet)$ is a Gaussian error function.

For MQAM (Quadrature Amplitude Modulation, M is a modulation order), the error probability is computed as shown in Equation (12) by $$f_{M_{TX}(m)=MQAM}(SNR_m) = 1 - \left(1 - 2\left(1 - \frac{1}{\sqrt{M}}\right)Q\left(\sqrt{\frac{3}{M-1}SNR_m}\right)\right)^2 \quad (12)$$

where $Q(\bullet)$ is a Gaussian error function.

The stream error probability calculator 410 finally calculates the error probability of each stream according to the modulation of the stream as shown in Equation (13) by $$P_s(m|H) = f_{M_{TX}(m)}(SNR_m) \quad (13)$$

where $M_{TX}(m)$ denotes the modulation order of an $m^{th}$ element in a symbol vector s and $P_s(m|H)$ denotes the error probability of the $m^{th}$ stream, given an instantaneous channel matrix H. The ordering/sorting processor 420 orders/sorts the error probabilities in an ascending or descending order and provides the resulting ordering/sorting information to the low-complexity ML detector.

Figure 5:
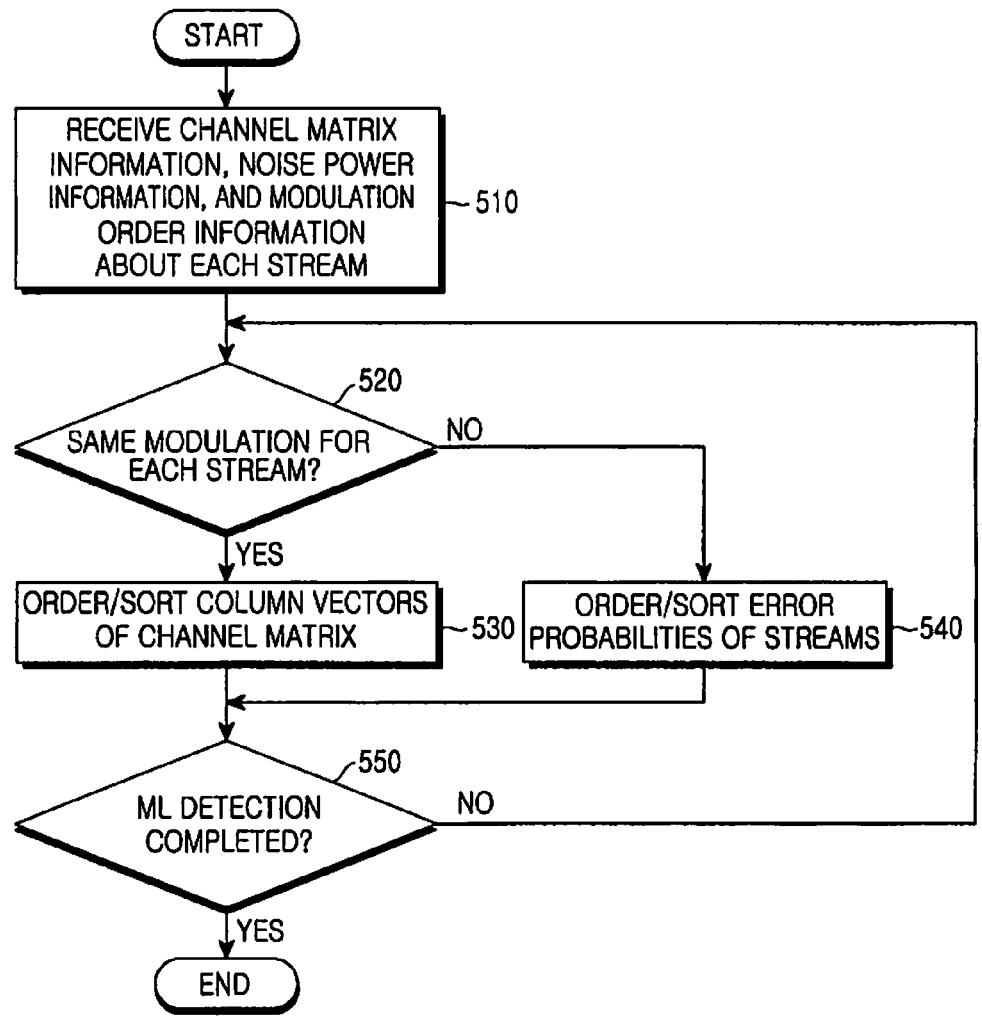
FIG. 5 illustrates an operation of the low-complexity ML receiver according to the present invention.

FIG. 5 illustrates an operation of the low-complexity ML receiver according to the present invention.

Referring to FIG. 5, the low-complexity ML receiver receives channel matrix information, noise power information and modulation order information about each stream in step 510. In step 520, the low-complexity ML receiver determines whether the same or different modulation schemes apply to streams. If the same modulation scheme is used, the low-complexity ML receiver conventionally performs ordering/sorting based on the column vector norms of a channel matrix in step 530 and proceeds to step 550.

However, if the streams use different modulation schemes, the low-complexity ML receiver performs ordering/sorting based on the error probability of each stream according to the present invention in step 540 and proceeds to step 550.

In step 550, the low-complexity ML receiver determines whether ML detection has been completed, considering ordering/sorting information. If the ML detection is not completed, the low-complexity ML receiver returns to step 520.

As is apparent from the above description, the present invention advantageously improves the performance of a low-complexity ML receiver that receives different streams modulated by different modulation schemes by ordering/sorting error probabilities on a stream basis in a MIMO system using different modulation schemes.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. A Maximum Likelihood (ML) detection method in a wireless communication system, comprising:
    calculating a Euclidean distance between two transmission symbols among a plurality of streams using at least one of channel matrix information, noise power information and modulation order information of each stream;
    calculating Pairwise Error Rate (PER) based on a total transmit power, noise power, the Euclidean distance, and an instantaneous channel matrix;
    calculating an error probability of the each stream using the PER;
    ordering and sorting the error probability of the each stream; and
    performing ML detection using a result of the ordering and sorting,
    wherein if the two transmission symbols includes a first symbol and a second symbol and the first symbol is transmitted, the PER represents a probability of incorrectly detecting the second symbol for the first symbol.

2. The ML detection method of claim 1, wherein the Euclidean distance calculation comprises calculating the Euclidean distance by the following equation, $$d_{ij}^2(H) = \|H(\hat{s}_i - \hat{s}_j)\|_F^2$$

where $\hat{s}_i$ and $\hat{s}_j$ denote transmission symbols, H denotes instantaneous channel matrix, and $\|\cdot\|_F^2$ is a Frobenius vector norm.

3. The ML detection method of claim 1, wherein the PER calculation comprises calculating the PER by the following equation, $$P(\hat{s}_i \rightarrow \hat{s}_j | H) = Q\left(\sqrt{\frac{E_s}{2\sigma_n^2} d_{ij}^2(H)}\right)$$

where $E_s$ denotes the total transmit power, $\sigma_n^2$ denotes the noise power, $d_{ij}^2$ denotes the Euclidean distance, Q(x) denotes a Gaussian error function, and $P(\hat{s}_i \rightarrow \hat{s}_j | H)$ denotes a probability of detecting an incorrect $\hat{s}_j$ for a transmitted symbol $\hat{s}_i$, when the instantaneous channel matrix H is given.

4. The ML detection method of claim 1, wherein the error probability calculation comprises calculating the error probability of the each stream by the following equation, $$P_s(m|H) \leq \sum_i P(\hat{s}_i) \sum_{i \neq j} \kappa_m(\hat{s}_i, \hat{s}_j) P(\hat{s}_i \rightarrow \hat{s}_j | H) + f_m(e)$$

where $P_s(m|H)$ denotes the error probability of an $m^{th}$ stream for the instantaneous channel matrix H, $P(\hat{s}_i)$ denotes a probability of $\hat{s}_i$ being transmitted, $\kappa_m(\hat{s}_i, \hat{s}_j)$ denotes
a parameter indicating whether a symbol of the $m^{th}$ stream in $\hat{s}_i$ is different to a symbol of the $m^{th}$ stream in $\hat{s}_j$, $P(\hat{s}_i \rightarrow \hat{s}_j | H)$ denotes a probability of detecting an incorrect $\hat{s}_j$ for a transmitted symbol $\hat{s}_i$, for the instantaneous channel matrix H, and $f_m(e)$ is a function for correcting errors that occur in the $m^{th}$ stream.

5. The ML detection method of claim 4, wherein the error probability calculation comprises:
    calculating, when a first stream is generated using a Binary Phase Shift Keying (BPSK) scheme, an error probability of the first stream by the following equation, $$P_s(1|H) \leq \frac{1}{8} \sum_i \sum_{i \neq j} K_m(\hat{s}_i, \hat{s}_j) P(\hat{s}_i \rightarrow \hat{s}_j | H) =$$

$$\frac{1}{4}(P(\hat{s}_1 \rightarrow \hat{s}_5 | H) + P(\hat{s}_1 \rightarrow \hat{s}_6 | H) + P(\hat{s}_1 \rightarrow \hat{s}_7 | H) + P(\hat{s}_1 \rightarrow \hat{s}_8 | H) +$$

$$P(\hat{s}_2 \rightarrow \hat{s}_5 | H) + P(\hat{s}_2 \rightarrow \hat{s}_6 | H) + P(\hat{s}_2 \rightarrow \hat{s}_7 | H) +$$

$$P(\hat{s}_2 \rightarrow \hat{s}_8 | H) + P(\hat{s}_3 \rightarrow \hat{s}_5 | H) + P(\hat{s}_3 \rightarrow \hat{s}_6 | H) +$$

$$P(\hat{s}_3 \rightarrow \hat{s}_7 | H) + P(\hat{s}_3 \rightarrow \hat{s}_8 | H) + P(\hat{s}_4 \rightarrow \hat{s}_5 | H) +$$

$$P(\hat{s}_4 \rightarrow \hat{s}_6 | H) + P(\hat{s}_4 \rightarrow \hat{s}_7 | H) + P(\hat{s}_4 \rightarrow \hat{s}_8 | H); \text{ and}$$

calculating, when a second stream is generated using a Quadrature Phase Shift Keying (QPSK) scheme, an error probability of the second stream by the following equation, $$P_s(2|H) \leq$$

$$\frac{1}{4}(P(\hat{s}_1 \rightarrow \hat{s}_2 | H) + P(\hat{s}_1 \rightarrow \hat{s}_3 | H) + P(\hat{s}_1 \rightarrow \hat{s}_4 | H) + P(\hat{s}_1 \rightarrow \hat{s}_6 | H) +$$

$$P(\hat{s}_1 \rightarrow \hat{s}_7 | H) + P(\hat{s}_1 \rightarrow \hat{s}_8 | H) + P(\hat{s}_2 \rightarrow \hat{s}_3 | H) + P(\hat{s}_2 \rightarrow \hat{s}_4 | H) +$$

$$P(\hat{s}_2 \rightarrow \hat{s}_5 | H) + P(\hat{s}_2 \rightarrow \hat{s}_7 | H) + P(\hat{s}_2 \rightarrow \hat{s}_8 | H) + P(\hat{s}_3 \rightarrow \hat{s}_4 | H) +$$

$$P(\hat{s}_3 \rightarrow \hat{s}_5 | H) + P(\hat{s}_3 \rightarrow \hat{s}_6 | H) + P(\hat{s}_3 \rightarrow \hat{s}_8 | H) + P(\hat{s}_4 \rightarrow \hat{s}_5 | H) +$$

$$P(\hat{s}_4 \rightarrow \hat{s}_6 | H) + P(\hat{s}_4 \rightarrow \hat{s}_7 | H) + P(\hat{s}_5 \rightarrow \hat{s}_6 | H) + P(\hat{s}_5 \rightarrow \hat{s}_7 | H) +$$

$$P(\hat{s}_5 \rightarrow \hat{s}_8 | H) + P(\hat{s}_6 \rightarrow \hat{s}_7 | H) + P(\hat{s}_6 \rightarrow \hat{s}_8 | H) + P(\hat{s}_7 \rightarrow \hat{s}_8 | H)).$$

6. A Maximum Likelihood (ML) detection method in a wireless communication system, comprising:
    calculating a Signal-to-Noise Ratio (SNR) of each stream, proportional to norms of column vectors of a channel matrix, using at least one of channel matrix information, noise power information and modulation order information of the each stream;
    calculating an error probability of the each stream using the SNR;

ordering and sorting the error probability of the each stream; and performing ML detection using a result of the ordering and sorting, wherein the SNR is calculated by using a number of transmit antennas, a specific column corresponding to a specific stream of the channel matrix, a norm of the specific column, a total transmit power, and noise power.

7. The ML detection method of claim 6, wherein the SNR calculation comprises calculating the SNR by the following equation, $$SNR_m = \frac{\|h_m\|^2}{N_T} \cdot \frac{E_s}{\sigma_n^2}$$

where $SNR_m$, denotes the SNR of an $m^{th}$ stream, $N_T$ denotes the number of transmit antennas, $h_m$ denotes an $m^{th}$ column of the channel matrix H, $\|\cdot\|^2$ denotes a vector norm operation, $E_s$ denotes the total transmit power, and $\sigma_n^2$ denotes the noise power.

8. The ML detection method of claim 6, wherein the error probability calculation comprises calculating the error probability of the each stream by the following equation, $$P_s(m|H) = f_{M_{TX}(m)}(SNR_m)$$

where $P_s(m|H)$ denotes an error probability of the $m^{th}$ stream for the channel matrix H and $f_{M_{TX}(m)}(SNR_m)$ denotes a symbol error probability of the $m^{th}$ stream.

9. A Maximum Likelihood (ML) detection apparatus in a wireless communication system, comprising:

a Euclidean distance calculator for calculating a Euclidean distance between two transmission symbols among a plurality of streams using at least one of channel matrix information, noise power information and modulation order information of each stream;

a Pairwise Error Rate (PER) calculator for calculating a PER based on a total transmit power, noise power, the Euclidean distance, and an instantaneous channel matrix;

a stream error probability calculator for calculating an error probability of the each stream using the PER; and an order and sorter for ordering and sorting the error probability of the each stream, wherein if the two transmission symbols includes a first symbol and a second symbol and the first symbol is transmitted, the PER represents a probability of incorrectly detecting the second symbol for the first symbol.

10. The ML detection apparatus of claim 9, wherein the Euclidean distance calculator calculates the Euclidean distance by the following equation, $$d_{ij}^2(H) = \|H(\hat{s}_i - \hat{s}_j)\|_F^2$$

where $\hat{s}_i$ and $\hat{s}_j$ denote transmission symbols, H denotes the instantaneous channel matrix, and $\|\cdot\|_F^2$ is a Frobenius vector norm.

11. The ML detection apparatus of claim 9, wherein the PER calculator calculates the PER by the following equation, $$P(\hat{s}_i \to \hat{s}_j | H) = Q\left(\sqrt{\frac{E_s}{2\sigma_n^2} d_{ij}^2(H)}\right)$$

where $E_s$ denotes the total transmit power, $\sigma_n^2$ denotes the noise power, $d_{ij}^2$ denotes the Euclidean distance, Q(x) denotes a Gaussian error function, and $P(\hat{s}_i \to \hat{s}_j|H)$ denotes a probability of detecting an incorrect $\hat{s}_j$ for a transmitted symbol $\hat{s}_i$, when the instantaneous channel matrix H is given.

12. The ML detection apparatus of claim 9, wherein the stream error probability calculator calculates the error probability of the each stream by the following equation, $$P_s(m|H) \leq \sum_i P(\hat{s}_i) \sum_{i \neq j} \kappa_m(\hat{s}_i, \hat{s}_j) P(\hat{s}_i \to \hat{s}_j | H) + f_m(e)$$

where $P_s(m|H)$ denotes the error probability of an $m^{th}$ stream for the instantaneous channel matrix H, $P(\hat{s}_i)$ denotes a probability of $\hat{s}_i$ being transmitted, $\kappa_m(\hat{s}_i,\hat{s}_j)$ denotes a parameter indicating whether a symbol of the mth stream in $\hat{s}_i$ is different to a symbol of the mth stream in $\hat{s}_j$, $P(\hat{s}_i \to \hat{s}_j|H)$ denotes a probability of detecting an incorrect $\hat{s}_j$ for a transmitted symbol $\hat{s}_i$, for the instantaneous channel matrix H, and $f_m(e)$ denotes a function for correcting errors that occur in the $m^{th}$ stream.

13. The ML detection apparatus of claim 12, wherein the stream error probability calculator calculates, when a first stream is generated using a Binary Phase Shift Keying (BPSK) scheme, an error probability of the first stream by the following equation, $$P_s(1|H) \leq \frac{1}{8} \sum_i \sum_{i \neq j} K_m(\hat{s}_i, \hat{s}_j) P(\hat{s}_i \to \hat{s}_j | H) =$$

$$\frac{1}{4}(P(\hat{s}_1 \to \hat{s}_5 | H) + P(\hat{s}_1 \to \hat{s}_6 | H) + P(\hat{s}_1 \to \hat{s}_7 | H) + P(\hat{s}_1 \to \hat{s}_8 | H) +$$

$$P(\hat{s}_2 \to \hat{s}_5 | H) + P(\hat{s}_2 \to \hat{s}_6 | H) + P(\hat{s}_2 \to \hat{s}_7 | H) + P(\hat{s}_2 \to \hat{s}_8 | H) +$$

$$P(\hat{s}_3 \to \hat{s}_5 | H) + P(\hat{s}_3 \to \hat{s}_6 | H) + P(\hat{s}_3 \to \hat{s}_7 | H) + P(\hat{s}_3 \to \hat{s}_8 | H) +$$

$$P(\hat{s}_4 \to \hat{s}_5 | H) + P(\hat{s}_4 \to \hat{s}_6 | H) + P(\hat{s}_4 \to \hat{s}_7 | H) + P(\hat{s}_4 \to \hat{s}_8 | H))$$

and calculates, when a second stream is generated using a Quadrature Phase Shift Keying (QPSK) scheme, an error probability of the second stream by the following equation, $$P_s(2|H) \leq$$

$$\frac{1}{4}(P(\hat{s}_1 \to \hat{s}_2 | H) + P(\hat{s}_1 \to \hat{s}_3 | H) + P(\hat{s}_1 \to \hat{s}_4 | H) + P(\hat{s}_1 \to \hat{s}_6 | H) +$$

$$P(\hat{s}_1 \to \hat{s}_7 | H) + P(\hat{s}_1 \to \hat{s}_8 | H) + P(\hat{s}_2 \to \hat{s}_3 | H) + P(\hat{s}_2 \to \hat{s}_4 | H) +$$

$$P(\hat{s}_2 \to \hat{s}_5 | H) + P(\hat{s}_2 \to \hat{s}_7 | H) + P(\hat{s}_2 \to \hat{s}_8 | H) + P(\hat{s}_3 \to \hat{s}_4 | H) +$$

$$P(\hat{s}_3 \to \hat{s}_5 | H) + P(\hat{s}_3 \to \hat{s}_6 | H) + P(\hat{s}_3 \to \hat{s}_8 | H) + P(\hat{s}_4 \to \hat{s}_5 | H) +$$

$$P(\hat{s}_4 \to \hat{s}_6 | H) + P(\hat{s}_4 \to \hat{s}_7 | H) + P(\hat{s}_5 \to \hat{s}_6 | H) + P(\hat{s}_5 \to \hat{s}_7 | H) +$$

$$P(\hat{s}_5 \to \hat{s}_8 | H) + P(\hat{s}_6 \to \hat{s}_7 | H) + P(\hat{s}_6 \to \hat{s}_8 | H) + P(\hat{s}_7 \to \hat{s}_8 | H))$$

14. A Maximum Likelihood (ML) detection apparatus in a wireless communication system, comprising:

a Signal-to-Noise Ratio (SNR) calculator for calculating a SNR of each stream, proportional to norms of column vectors of a channel matrix, using at least one of channel matrix information, noise power information and modulation order information of the each stream;

a stream error probability calculator for calculating an error probability of the each stream using the SNR; and an order and sorter for ordering and sorting the error probability of the each stream, wherein the SNR is calculated by using a number of transmit antennas, a specific column corresponding to a specific stream of the channel matrix, a norm of the specific column, a total transmit power, and noise power.

15. The ML detection apparatus of claim 14, wherein the SNR calculator calculates the SNR by the following equation, $$SNR_m = \frac{\|h_m\|^2}{N_T} \cdot \frac{E_s}{\sigma_n^2}$$

where $SNR_m$ denotes the SNR of an mth stream, NT denotes the number of transmit antennas, $h_m$ denotes an mth column of the channel matrix H, $\|\cdot\|^2$ denotes a vector norm operation, $E_s$ denotes the total transmit power, and $\sigma_n^2$ denotes the noise power.

16. The ML detection apparatus of claim 14, wherein the stream error probability calculator calculates the error probability of the each stream by the following equation, $$P_s(m|H) = f_{M_{TX}(m)}(SNR_m)$$

where $P_s(m|H)$ denotes an error probability of the mth stream for the channel matrix H and $f_{M_{TX}(m)}(SNR_m)$ denotes a symbol error probability of the $m^{th}$ stream.

17. The ML detection method of claim 1, wherein ordering and sorting the error probability of the each stream comprises ordering and sorting the error probability of each stream in an ascending or descending order.

18. The ML detection method of claim 6, wherein ordering and sorting the error probability of each stream comprises ordering and sorting the error probability of each stream in an ascending or descending order.

19. The ML detection apparatus of claim 9, wherein the orderer and sorter orders and sorts the error probability of each stream in an ascending or descending order.

20. The ML detection apparatus of claim 14, wherein the orderer and sorter orders and sorts the error probability of each stream in an ascending or descending order.

\* \* \* \* \*